United States Patent
Levin

(10) Patent No.: US 8,239,369 B2
(45) Date of Patent: Aug. 7, 2012

(54) METHOD AND APPARATUS FOR ENHANCING PERFORMANCE OF DATABASE AND ENVIRONMENT THEREOF

(75) Inventor: Amihai Levin, Jerusalem (IL)

(73) Assignee: DBSophic, Ltd., Jerusalem (IL)

(*) Notice: Subject to any disclaimer, the term of this patent is extended or adjusted under 35 U.S.C. 154(b) by 373 days.

(21) Appl. No.: 12/051,900

(22) Filed: Mar. 20, 2008

(65) Prior Publication Data
US 2009/0240711 A1 Sep. 24, 2009

(51) Int. Cl.
G06F 17/30 (2006.01)
(52) U.S. Cl. .......................... 707/713; 707/715
(58) Field of Classification Search .................. 707/713, 707/715
See application file for complete search history.

(56) References Cited

U.S. PATENT DOCUMENTS

| | | | |
|---|---|---|---|
| 6,223,171 B1* | 4/2001 | Chaudhuri et al. | 707/718 |
| 6,275,818 B1* | 8/2001 | Subramanian et al. | 1/1 |
| 6,571,233 B2 | 5/2003 | Beavin et al. | 707/713 |
| 6,629,094 B1* | 9/2003 | Colby et al. | 707/713 |
| 6,801,906 B1* | 10/2004 | Bates et al. | 707/707 |
| 6,882,995 B2* | 4/2005 | Nasr et al. | 707/713 |
| 7,110,997 B1* | 9/2006 | Turkel et al. | 707/713 |
| 7,203,685 B2* | 4/2007 | Abdo et al. | 707/713 |
| 7,747,606 B2* | 6/2010 | Dageville et al. | 707/713 |
| 2003/0065986 A1 | 4/2003 | Fraenkel et al. | |
| 2004/0215626 A1 | 10/2004 | Colossi et al. | |
| 2005/0086195 A1 | 4/2005 | Tan et al. | |
| 2007/0162514 A1 | 7/2007 | Civetta et al. | |
| 2009/0112775 A1* | 4/2009 | Chiulli et al. | 705/36 R |

FOREIGN PATENT DOCUMENTS

| | | |
|---|---|---|
| WO | 2005024669 | 3/2005 |
| WO | 2008003077 | 1/2008 |

OTHER PUBLICATIONS

Supplementary European Search Report for the related European Patent Application EP 09 72 2875; Date of Mailing: Mar. 31, 2011.
Written Opinion for the related European Patent Application EP 09 722 875.3; Date of Mailing Apr. 26, 2011.

* cited by examiner

*Primary Examiner* — Kim Nguyen
(74) *Attorney, Agent, or Firm* — Myers Wolin, LLC

(57) ABSTRACT

A method and apparatus for enhancing the performance of an environment comprising a database system. The method and apparatus employ collection stage for collecting data related to substantially all aspects of the system, including hardware, operating system, database, database schema, content and activity. Multiple issues relating to multiple categories are detected within the collected information. Then the detected issues are analyzed by correlating and prioritizing them. The issues that receive the highest priority are preferably those whose correction will yield the most significant improvement on the overall performance of the system. One or more recommendations are then issued for correcting the root issues hindering performance. Preferably, for one or more recommendations, scripts are generated which are then executed manually or automatically.

24 Claims, 3 Drawing Sheets

METHOD AND APPARATUS FOR ENHANCING PERFORMANCE OF DATABASE AND ENVIRONMENT THEREOF

TECHNICAL FIELD

The present disclosure relates to databases in general, and to a method and apparatus for enhancing the performance of processes in databases and environments thereof, in particular.

BACKGROUND

A computer database is a structured collection of records or data stored in a computer system. The term "database" refers to the collection of interrelated information records and software components designed to maintain and provide access to the information, in ways including maintaining, adding, deleting, updating, querying, retrieving, generating reports and other operations. Databases are generally manipulated using query language commands, such as SQL, optionally comprising sub-categories such as Data Manipulation Language (DML), Data Control Language (DCL), and Data Control Language (DCL), or any proprietary command set used for High Availability (HA), Disaster Recovery (DR), or the like.

A database can be arranged in a number of ways, the most common being relational databases in which the information is organized in relations, often referred to as tables; hierarchical databases in which the information is organized as one or more object hierarchies in which objects have ancestor and descendent relationship; network databases, in which the information is organized as a lattice, in which each object is connected to multiple other objects in ancestor/descendent relationship, and Object Oriented Data Bases (OODB) in which information is represented in the form of objects as used in Object-Oriented Programming information.

A data base is typically constructed upon a structural description of the information, referred to as a schema. The schema contains the database objects that reflect the entities and their interrelations of the universe of disclosure that the database represents.

The performance of a database or a computerized environment comprising a database can be evaluated using multiple parameters, including time-related parameters such as response time or query duration, storage requirements, concurrency, integrity, and recovery from failures.

The time-related performance of a database, i.e. the time required for various actions, and the storage requirements depend upon many factors. The factors include but not limited to: the type of database; the specific arrangement of the database; the type and frequency of actions performed, e.g. more data modifications vs. more data retrievals; the hardware equipment used in the system; communication channels and their characteristics; specific implementations of objects such as stored procedures; query coding syntax; coding techniques; database and environment variables and configuration settings and additional factors.

There are a variety of commercial tools for testing one or more aspects of database performance, the tools implemented either as a part of a database or as an external unit. However, no such tool is known that tests multiple possible causes of performance deficiencies, including the database scheme, hardware, usage modes and others. Further, the possible causes are not independent of each other. Rather, they may strongly influence each other, such that correcting one problem worsens another. For example, if a table is often queried for data retrieval, adding another index may speed up the performance of data retrieval queries. However, if the same table is also frequently modified, the additional index may harm the modification performance. In another example, improving the hardware may significantly speed up the performance of hardware-related issues in, but may have negligible contribution to the overall performance, and is thus not worth the investment. Thus, tools that test or provide recommendations as to improving database performance, do not refer to interrelations between different factors, and their recommendations are therefore superficial and do not get to the root of the problems.

In addition, such tools may provide numerous results, which may or may not be prioritized. However, the interrelationships between the various factors can make locating the best cost effective factors impossible without deep understanding of databases in general and the specific database in particular.

Yet another problem relates to correcting the detected problems and their causes. A user may not have fill understanding of the database so that he or she can fix the problem. Often, an approach of not fixing a working system is applied, which prevents improvements and enhancement, because of the fear to worsen performance or break application dependencies which may cause a more serious issue than the original one.

There is thus a need for a method and apparatus that will enable automatic detection or correction of the root causes of database performance issues, and bottlenecks in databases. The method and apparatus should identify the causes of performance problems and suggest ways of enhancing and improving them. The method and apparatus should also be able to fix some of the problems without requiring user expertise.

SUMMARY

A method and apparatus for enhancing the performance of an environment comprising a database. The method and apparatus optionally collect data from multiple aspects and components of the environment, including hardware, operating system, database installation, Database schema, database data, activity and others, detect performance issues within the collected data, correlate the issues to reveal analysis issues and suggest recommendations. Some recommendations can be performed automatically with some degree of user authorization, according to the risk associated with the recommendation and the resources required for its implementation.

In accordance with one aspect of the disclosure there is thus provided in a computerized environment comprising one or more server computing platforms executing a database engine, a method for enhancing the performance of the database engine or the computerized environment, the method comprising the steps of: receiving data related to two or more aspects of the environment; detecting from the data two or more detection issues associated with two or more detection categories of the system; and analyzing one or more analysis issues related to one or more analysis categories, according to the detection issues and correlation of the detection issues. The method optionally comprises a step of issuing one or more recommendations related to the detection issues. The method optionally comprises a step of generating a script for implementing one or more recommendations or a step of executing the script. The method can further comprise a step of collecting the data related to the aspects of the environment. Within the method, the data optionally relates to any two or more aspects selected from the group consisting of:

hardware; operating system; database engine; database meta data; data stored in the database; activity; performance metrics; and historical trends. The database meta data optionally comprises one or more items from the group consisting of: database schema; database objects; and database code. Within the method, the detection categories are optionally selected from the group consisting of: database schema; index schema; programming objects code; programming objects usage; database configuration; instance configurations; server configuration; hardware; security; and activity. Within the method, the activity detection category optionally relates to one or more activities from the group consisting of: retrieving data from a database; adding data to a database; updating data within a database; and deleting data from a database. Within the method, the analysis category is optionally selected from the group consisting of: hardware, operating system configuration; instance configuration: database configuration; application configuration; database schema; index schema; server side object; application query coding; security; and maintenance. The method optionally comprises a reporting step for reporting to a user the information related to the detection step or to the analysis step.

In accordance with another aspect of the disclosure there is thus provided in a computerized environment comprising a computing platform executing a database engine an apparatus for enhancing the performance of the database engine or the computerized environment, the apparatus comprising: detection components, the detection components comprising one or more specific detection components for assessing the existence of a situation associated with the detection rule within the environment; analysis components, the analysis components comprising: one or more specific analysis components for applying one or more analysis rules on the situation associated with the detection; and a performance enhancement estimation component for evaluating the performance enhancement of resolving the situation associated with the analysis rules. Within the apparatus, the specific detection components optionally comprise one or more components from the group consisting of: an activity detection component; an indexing detection component; a query detection component; a schema detection component; a data detection component; and a programming object detection component. Within the apparatus, the detection components optionally comprise a rule engine for activating the specific detection components. Within the apparatus the specific analysis components optionally comprise one or more components from the group consisting of: database schema analysis component; indexing schema analysis component; server side code analysis component; application code analysis component; server configuration analysis component; instance configuration analysis component; database configuration analysis component; application configuration analysis component; hardware analysis component; security analysis component; and maintenance analysis component. Within the apparatus, the analysis components optionally comprise a prioritization estimation component for prioritizing the analysis rules. The apparatus can further comprise recommendation components, the recommendation components comprising a recommendation issuing component for issuing one or more recommendations for resolving the situation associated with the analysis rules. Within the apparatus, the recommendation components can further comprise a script generation component for generating a script for resolving the situations associated with the analysis rules, or a script execution component for executing a script for resolving the situation associated with the analysis rules. The apparatus can further comprise collection components for collecting the data from the environment. Within the apparatus, the collection components can comprise one or more components from the group consisting of: database query component; operating system component; hardware component; memory structures component; registry access component; trace collection component; log collection component; and data aggregator component. The apparatus can further comprising a reporting component for reporting to a user one or more results of the detection components or the analysis components. Within the apparatus the computerized environment optionally comprises one or more client computing platforms.

Yet another aspect of the disclosure relates to a computer readable storage medium containing a set of instructions for a general purpose computer, the set of instructions comprising: receiving data related to two or more aspects of a computerized environment comprising one or more computing platforms executing a database engine; detecting from the data two or more detection issues associated with two or more detection categories of the system; and analyzing one or more analysis issues related to one or more analysis categories, according to the two or more detection issues and correlation of the at two or more detection issues.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

DETAILED DESCRIPTION

In a preferred embodiment of the disclosure, multiple steps are performed for analyzing and enhancing the performance of a database system. In a first step, data is collected regarding multiple aspects and components of the system, including but not limited to hardware, operating system, database meta data, activity to or within the database and additional information.

On a second step, the collected data, or similar data received from an external source, is processed to detect issues that hinder performance. For example, a rule may be applied indicating that columns appearing in a "Select" command, i.e. columns upon which records are selected from a relation, should be contained in an index.

After the issues are identified, an analysis step is performed, in which combinations of detected issues are examined to reveal performance problems and possible solutions. The recommendation step can be performed together with the analysis step, or as a separate step. For example, a combination of frequent "Insert" commands, rare "Select" commands and multiple indexes for a relation may be reported as an index schema problem, since updating the indexes for every insert command takes significant resources, while taking advantage of the indexes for retrieving information is rare. In such cases, a suggestion might be made to drop one or more indexes. On the other hand, for example, a low-speed or low-performance CPU is not analyzed as a problem and no replacement suggestion is made, if the CPU requirements of the system are low.

Throughout one or more of the steps above, a reporting step is optionally activated, for reporting the detection and analysis results and delivering the suggestions to a user. Another optional step is automatic or semi-automatic implementation of the suggested solutions made during the analysis step. For example, adding a single-byte numeric-column index to a table, an operation which has a relatively low risk for hurting performance can be performed requiring only some form of user confirmation, such as a general authorization, while deleting an index or re-writing stored procedure, an action which may have a negative impact on system performance, will preferably necessitate specific authorization from the user. For corrections that can be performed automatically, a script is preferably generated for accomplishing the correction. The script can then be executed automatically or manually by the user.

Figure 1:
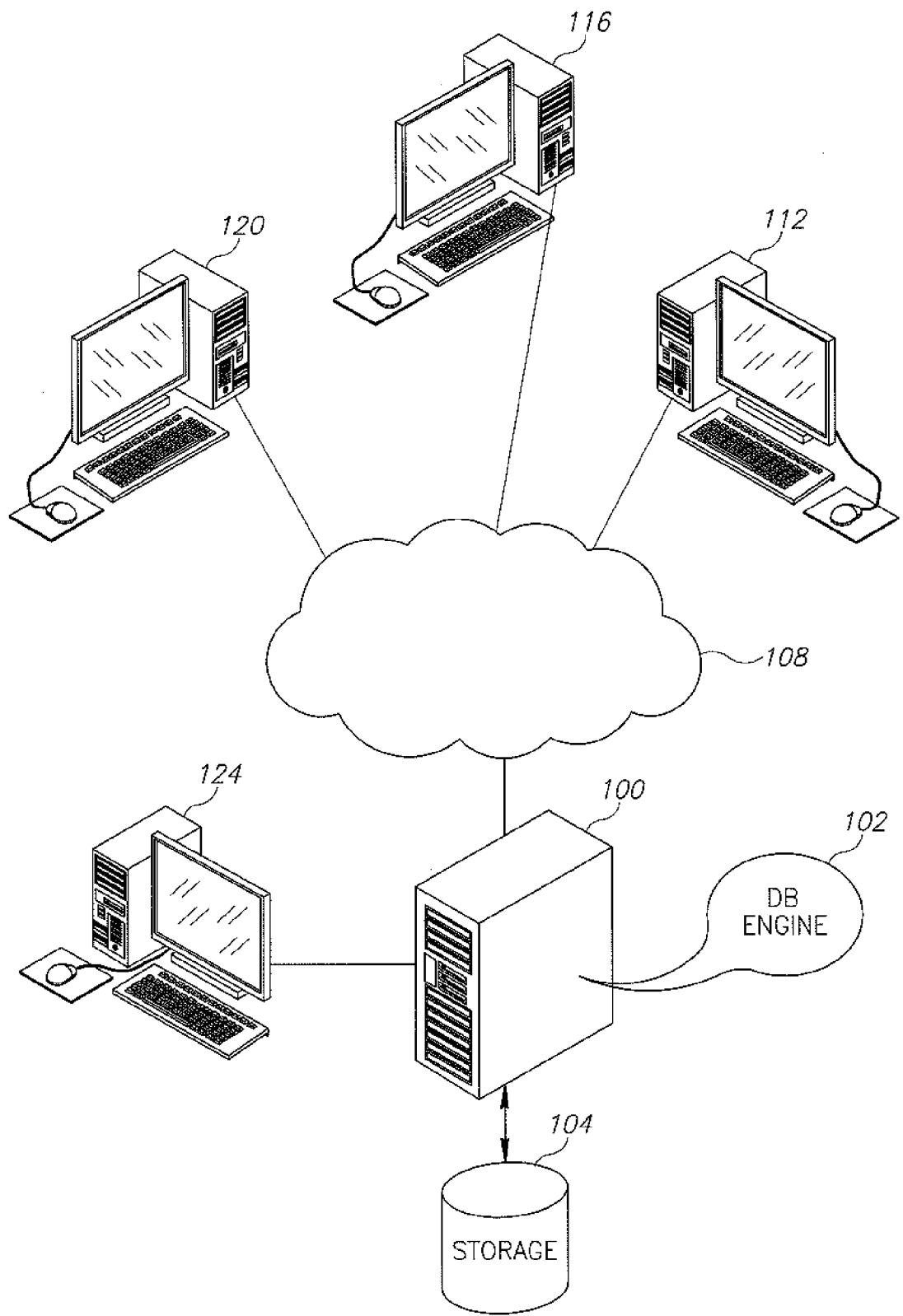
FIG. 1 is a schematic illustration of the environment in which the disclosure is used.

Referring now to FIG. 1, showing an exemplary environment in which the disclosure is used.

Server 100 comprises a database server engine 102. Server 100 further comprises or is in communication with storage unit 104. Server 100 is a computing platform, such as a such as a mainframe computer, a personal computer, or any other type of computing platform provisioned with a memory device (not shown), a CPU or microprocessor device, and one or more I/O ports (not shown). Storage unit 104 is preferably a mass storage device, for example an optical storage device such as a CD, a DVD, or a laser disk; a magnetic storage device such as a tape or a hard disk; a semiconductor storage device such as Flash device, memory stick, or the like. Database server engine 102 is preferably a software component which accesses the data stored on storage unit 104, maintains the data and its integrity, and provides additional entities such as clients, with access to the data. Server engine 102 is preferably implemented as interconnected sets of computer instructions. The computer instructions can comprise tools which serve any database, such as third party tools developed for controlling the data and access thereto, for example SQL engine, as well as proprietary commands, stored procedures, and other sets required for controlling the specific data and its arrangement. Server 100 is preferably connected to a communication channel 108, such as a local area network (LAN), a wide area network (WAN), the Internet, Intra-net, telephone network, and the like, employing commonly used protocols such as TCP, IP, IPTV or derivatives thereof. The environment preferably comprises users, each user using a computing platform, such as platforms 112, 116, 120 connected to server 100 through communication channel 108, or platform 124 connected directly to server 100. Any of computing platforms 112, 116, 120 or 124 is a personal computer, a laptop computer, a portable computing platform such as a Personal Digital Assistant (PDA), a mobile phone with computing capabilities or the like. In a preferred embodiment, one or more users can be using client modules executed by server 100, rather than using a different computing platform.

Figure 2:
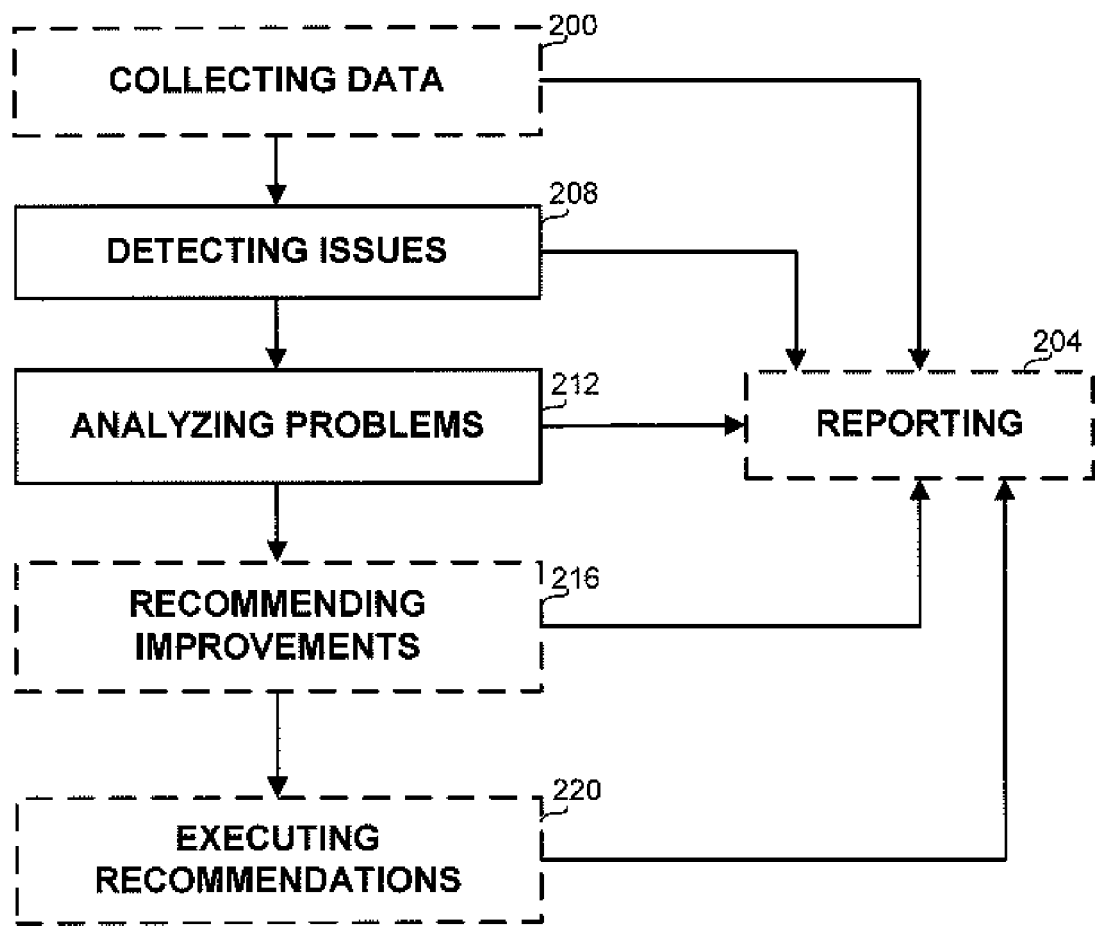
FIG. 2 is a flowchart of the main steps in a preferred embodiment of a method apparatus according to the disclosure.

Referring now to FIG. 2, showing a flowchart of the main steps in a preferred embodiment of a method for enhancing the performance of a database, in accordance with the disclosure. The steps detailed in association with FIG. 2 can be implemented in any computerized environment comprising any type of database. It will be appreciated by a person skilled in the art that although the principles are the same for all types of database, the specific implementation details may vary according to the database type. Some of the examples detailed below are general, while others refer mainly to Microsoft SQL server database engine technology. However, similar mechanisms to the ones used in the is examples are available for other types of database and can be used with slight modifications.

Collection

On step 200, data related to multiple components and aspects of the database and its usage is collected. The data comprises but is not limited to the following types:

Hardware meta data, which relates to the server's (such as server 100 of FIG. 1) characteristics, including CPU, RAM, disk arrays, network cards etc. Collection relates to resources capabilities as well as configuration issues such as cache and spindle allocations. Data can further be collected regarding characteristics of the user platforms' hardware.

Operating system meta data: including system environment resources and configurations such as operating system, installed service packs, software resource allocations or the like.

Database Management System: preferably a relational database management system (RDBMS) meta data, including RDBMS application configuration settings and resource allocations. In case database engine 102 supports multiple instances, for example as supported by SQL Server, the database meta data information is collected per instance.

Database Meta data: collection of database configuration settings and resource allocations. The data relates to the database organization and arrangements, including physical layout, schemas, tables, programming objects and the like.

Data Meta data: including data related to the actual data stored within the database, for example number of records in tables, actual data distribution, aggregations and statistical information, or the like.

Performance metrics data: including database, RDBMS, operating system, query, processes and hardware performance metrics at run time. The measured factors include metrics such as CPU, disk, network and memory utilizations, caching and paging metrics, connection activity and others.

Historical trends: including the changes over time of application and database behavior. The data can include comparing information collected in the past or collected from past images of the database and collecting change patterns such as volume changes, row deletion, addition or manipulation or the like.

User input: the above mentioned data, which is preferably collected automatically, may be supplemented by manual provisioning of the data by the user of the application. This includes additional queries, processes, performance logs, error logs, and others.

Activity data: relates to the actual application and user activities at run time. This includes actual queries and processes being submitted to and executed by the RDBMS. For servers supporting command tracing such as SQL Server, the command tracing will also be collected.

The collected activity-related information may include:
Database metadata, i.e. database objects structures and definitions, such as table and index structure, constraints and supporting objects such as data types, triggers, or the like.
Data metadata, i.e. statistical information about the data such as row count, value distribution, data aggregations, min/max and average values, min/max and average length of data, null value count or the like.
Performance counters, i.e. system run time metrics such as CPU consumption, hard disk utilization, memory utilization, data seek and scan metrics, login/logout rates, or the like.

Application and user operational information, e.g. queries submitted to the database for processing over a period of time. The operational information may include query text, resource consumption, row counts, execution plans, originating application, user information, or the like.

Historical data, i.e. past "images" of the data: historical data may include database backups, database snapshots, past analysis of the above, or the like.

The data is collected from any available source, including retrieving data from the hardware components of the environment, operating system, querying the database and its instances, tracking queries and responses, or others.

Step 200 is optional, and the data can be received from an external source, rather than collected by a system according to the disclosure.

On optional step 204 the collected data is optionally reported to a user. The data can be reported in any format, such as text, tables, graphs, images, lists, or others, and in any medium, including file, printed reports, e-mail, fax or others. Reporting step 204 can be revisited, as detailed below for every step, wherein the reports may develop according to the available data.

Detection

After data collection or receiving is completed, on issue detection step 208, detection issues relevant for performance deficiencies are searched for within the collected data. In a preferred but non-limiting implementation, the detection issues are detected using a rule engine. The rules can be coded into the engine, read from a configuration file, or otherwise introduced into the rule engine. The detected issues are divided to a number of detection categories listed below. It will be appreciated that additional issues can be defined and assigned to any of the categories, or new categories can be defined. The detection categories include but are not limited to:

Database schema: design flaws are detected in the database schema objects. The flaws may include table design issues such as normalization violations, key and constraint structures, data type capacity usage, and others. For example, In SQL Server, if a column is created with a data type of "INT" it will always take up 4 bytes. If the actual values detected in this column are bound in the range of 1 to 20, a data type misuse is detected. Another example might be multiple comma separated values found within a single string column which may defy $1^{st}$ normalization rule.

Index schema: in this category missing, ineffective or redundant indexes are detected in the current index scheme. In this category, missing indexes, ineffective indexes and special types of indexes such as indexed views and partitioned indexes are considered. For example, if a specific column in a specific table appears in a "Select" command, the particular column should be included within one or more indexes of the table used for the query. If the column is not a part of any index of the table, the issue is detected. Another example is the detection of multiple indexes with identical structures on a table. Indexes can alternatively be considered as part of the database schema category but it is possible and customary in database optimization to consider it as a separate category.

Query code: in this category issues related to the coding of query statements are detected. This category relates to issues within the statements as opposed to issues related to usage of the statements detailed below. The statements may include programming object code such as stored procedures, triggers, functions, constraints, ad hoc application queries, internal processes or the like. The issues detected in this category comprise sub optimal coding techniques, parameterization issues, conversion issues and others. For example, if a constant literal used within a search argument of a query is of a different data type than the column it is being compared with, an implicit conversion is required for the matching process which might hinder the engines ability to use indexes efficiently. Another example might be a semi join (a join between 2 tables wherein one of the tables is used as a filter and data is only required from the other table) which is coded using JOIN syntax instead of using EXISTS predicate, thus possibly hindering the database engine from generating optimal plans.

Programming objects usage: in this category issues related to the usage of server side programming objects such as stored procedures, triggers, functions, or other programming objects are detected. This category detects issues related to the use (such as by calling or otherwise activating) specific statements, rather than the way they are implemented. The issues may include parameter manipulation, multiple execution paths, statement order, function misuse, object execution properties and other issues. For example, if a programming object contains multiple conditional execution paths using flow control commands such as "IF", compilation might take considerably longer than required for the actual code that is executed since it requires a full compilation of all statements. Another example might be a parameter value manipulation inside the object code which may hinder the engines ability to generate optimal execution plans for queries that use these parameters.

Database configuration: non-standard or sub-optimal database level configuration settings are detected in this category. The settings include database physical resource allocation such as file distribution, database settings such as recovery model, automatic closing and shrinking or the like. For example, setting the "auto close" option of an SQL Server database to "ON" in a database where users login and logout of frequently may cause performance overhead for repeatedly releasing and allocating resources for the opening and closing of the database. Another example may be the placement of database data files and log files on the same physical drive or drive array which may cause IO contention for read and write operations.

Instance configurations: in some databases such as SQL, a database can have multiple installations, having different characteristics on a single operating system environment. Each such installation is called an instance. In this category, non-standard or sub-optimal instance level configuration settings are detected at a the instance level. The category includes rules related to resource allocation, behavior defaults, logging, instance objects or others. For example, setting the maximal memory usage allowed for the instance to a too low level may cause IO paging activity. Another example would be the existence of extensive auditing at the server level such as tracing, security audits, or the like, that use up CPU and IO resources.

Server configuration: this category relates to detecting non-standard or sub-optimal configuration settings associated with the operating system of the platform hosting the database engine, such as memory settings, competing resource consumers and others. For example, failing to specify the/3 GB switch in the BOOT.INI file of windows servers might hinder the operating system, and the database engine along with it, from using available RAM efficiently. Another example might be the detection of competing resource consuming services running under the same host operating system.

Hardware: this category refers to non-standard or sub-optimal settings and resource distribution at the hardware level. The detected issues can include RAID controller features and settings, memory allocations, network card throughput, hardware errors or warnings, and others. For example, the usage of a low end network card which uses CPU cycles for its processing might compete with the database engine CPU requirements. Another example might be a suboptimal RAID configuration such as using RAID 5 configurations for write intensive database files.

Security: in this category, security-related issues relating directly or indirectly to the security scheme of the user or application activity in the database are detected. The issues include object identifier defaults, login and logout rates, execution context sub-optimal usage, multiple permission paths and others. For example, failing to specify full object names might incur performance overhead as the database engine needs to process the rules for default security identifiers repeatedly. In another example the usage of multiple levels or multiple path permissions (such as a windows login in SQL Server which qualifies for several database engine login objects, including for example user login and group login) will require the database engine to evaluate the accumulated permissions of all matching logins prior to any object access, which in turn may incur a performance overhead.

Activity: in this category issues related to user and application behavioral patterns are detected from the collected information. This includes query metrics such as row count, table changes from historical information, table access patterns, query execution patterns, query execution statistics, log file analysis, memory structures data, file size changes etc. Several aspects of query structures and run time metrics are collected, including: read commands (e.g. SELECT) rate and volume; modification (e.g. INSERT, UPDATE, DELETE, TRUNCATE) rate and volume; reading patterns, for example whether it is a single row read, range read or full table read; modification patterns—including for example, is it a single row modification, range modification or full table modification. The issues are detected, among other sources, from data collected on collection step 200 from query tracing, server code queries, manually input queries, data aggregates, schema meta data, or the like. The detected issues include but are not limited to the following items for each table: total number of logical reads, rows fetched and fetch volume, for single row reads, range reads and full scans; and total number of writes, including the total number and volume of single row INSERT, UPDATE, or DELETE, range row INSERT, UPDATE, or DELETE, and fill table UPDATE, or DELETE. The numbers preferably refer separately to each query. Unlike other categories, detecting the activity category comprises analysis aspects. However, these aspects are preferably independent of analysis step 212 detailed below but are rather implemented as part of the detection step.

In a preferred embodiment of the disclosure, the number and volume of logical reads and rows fetched are determined as detailed below. However, it will be appreciated that other implementations exist, for example by analyzing transaction log files, memory structures, or the like. It will be further appreciated that a combination of multiple implementations can be used as well. The examples below refer to Microsoft SQL Server 2005 database engine, produced by Microsoft of Redmond, Va. (www.microsoft.com). However, the same principals can be applied to any other database. The number and volume are preferably determined as follows:

Read Commands

The sum of reads performed on a table is extracted from the trace log. The volume is determined according to the query elements required for fetching. This is done by parsing the elements of the query and looking for column expression either in the select list, join conditions, filters or others parts of the query. The column size is known from the schema metadata and the average length of variable columns is known from the data aggregator. In order to determine the volume, the estimated number of rows is multiplied by the estimated row size. If the data aggregator is not available, a predefined or configurable value is used, or the average key length is extracted from server statistics. A large deviation between the number of rows read and the number of rows fetched indicates poorly tuned table scope. The logical access paths are considered as well as the physical paths. For example, if a query looks for a single value on non-indexed column, the physical access path which is reflected in the trace read counter will include reads for all the rows, although the query retrieves only one row. Once the code is re-written properly or the column indexed, the physical access will match the logical one. There are a number of preferred embodiments for extracting or estimating the reads per table, including:

Query on a Single Table:

If a query refers only to one table in the FROM clause and has no aggregates, the trace counters reflect the actual metrics. If the volume is available from the metrics no further steps are required. For multi table queries and for queries with aggregates, the individual information can be obtained from execution plans of the query or from server objects, memory structures, or the like. If these are available, no further steps are required. The number of page reads, the number of affected rows, and the volumes are determined as described above, if the row count metric is available. If the "Rows affected" counter is unavailable, the WHERE part of the query is searched for search arguments expressions for the table. If the query contains a simple EQUAL filter on a column which is either defined as a primary key or is unique, or that the data aggregator shows it to be unique (or nearly unique, threshold should be configurable), the retrieval is generally considered as a single row fetch. It will be appreciated that fetching a number of rows may also be considered as a single row fetch, if the number of rows fetched is small relatively to the total number of rows, for example fetching up to ten or another configurable number of rows out of millions. If the filter is a simple comparison, such as >, <, BETWEEN, an EQUAL search on a non-unique column, it is generally considered a range retrieval. For search conditions on NULL and NOT NULL, the exact number of rows retrieved from the data aggregator NULL counts for the searched column. Thus, for determining the row count the following steps are required:

a. If the "rows affected" counter is available and the query does not contain aggregates (GROUP BY or DISTINCT), then record reads, number of affected rows and volumes are available.

b. If the query contains aggregates which invalidate the "rows affected" counter and other metrics for a specific table, or if the "rows affected" counter is not available the number of actual read rows is estimated:

c. If there is no "WHERE" clause, a full scan is indicated, which equals the table row count.

d. If the search contains an OR statement, skip to "guess" step (g). If there is a single search condition or all are "AND-ed", continue with (e) below.

e. If the "WHERE" clause references a unique column (either defined as unique or data is found to be unique within the defined threshold from the data aggregator results) with a "=<scalar expression>" predicate, a single row read is indicated (hereinafter—"single row reads"). This is true even if there are other SARG in the WHERE as long as they are all "AND-ed".

f. If the "WHERE" clause references a non unique column with a "<scalar expression>" or references a unique column with "!",">=","<=", "<", ">", "BETWEEN", "LIKE (wildcards)", "IN <list>", "ANY/SOME/ALL" or "EXISTS", a range read is assumed. For "IS NULL" and "IS NOT NULL" predicates, the actual maximum range limit is determined using the data aggregator null counts (hereinafter—"range row reads"). This is preferably used to limit the range factor guess limits.

g. If none of the conditions above is met, a constant, preferably configurable value, for example 20% of table row count is determined to denote a range scan estimate.

Multiple Table Queries

When a query comprises more than one joined table in the FROM clause, the total query counters of the rows affected and reads are irrelevant for a specific table. The specific information can be obtained from execution plans of the query or from server objects, memory structures and the like, if available. If not, more information has to be extracted from the metadata according to the query structure. The process is similar to the process above, and comprises:

a. If the table is the reserved table of an outer join and there is no SARG for that table, a full scan is required to retrieve all rows.

b. If one of the joined tables (table B) is filtered for a single row (as in the above conditions) and the join condition to the analyzed table (A) is on a unique column, then only one row will be retrieved. This is true even if the table is joined more than once.

c. If a table appears in the "FROM" clause more than once, it is treated as two separate "table queries", as it will be accessed twice.

d. For all other cases, the guess value is applied as above.

For server side code objects the code is referenced twice: the queries that comprise the object code statements, as well as the EXECUTE statements used to invoke the programming objects sampled from the trace with or without metrics. For server side programming objects the following rules are used:

If the trace for the EXECs contains row counts and the server object contains only one query, the same rule is used as for a single table SELECT. If the server object contains more than one query or if the trace does not provide row counts, the same rules are used as in multiple table selects (SARG analysis). If none of the SARG rules apply, the guess value is applied as above.

Total Number of Writes

Modification metrics are simpler since a query can modify only one table at a time.

As for volume determination: for DELETE or INSERT commands the volume is always a full row size. For UPDATE commands the volume is the sum of all columns that are SET within the update. In write commands, the "Rows affected" counter provides the exact number amount of modified rows.

For INSERT statements, a single row is accessed in the following conditions:

a. In INSERT . . . SELECT statements wherein the select statement complies with the conditions described above for "single row reads".

b. In INSERT . . . EXEC statements where the stored procedure code contains a single SELECT query that complies with the conditions described above for "single row reads".

c. In INSERT . . . VALUES statements, the number of rows is the number of values.

For UPDATE statements, a single row is accessed in UPDATE . . . WHERE statements where the SARG complies with the conditions described above for "single row reads".

For DELETE statements, a single row is accessed in DELETE . . . WHERE statements where the SARG complies with the conditions described above for "single row reads".

For INSERT statements, a range of rows is accessed in the following cases:

a. INSERT . . . SELECT statements where the SELECT statement complies with the conditions described above for range row reads.

b. BULK INSERT: if the "Rows affected" counter is not available, it is assumed that a significant amount of data is inserted. This is preferably implemented as a configurable parameter.

For UPDATE statements, a range of rows is accessed in an UPDATE . . . WHERE statement where the SARG complies with the conditions described above for "range row reads".

For DELETE statements, a range of rows is accessed in a DELETE . . . WHERE statement where the SARG complies with the conditions described above for "range row reads".

For UPDATE statements, the full table is accessed in an UPDATE statement with no WHERE clause.

For DELETE/TRUNCATE statements, the full table is accessed in the following cases:

a. TRUNCATE table b. DELETE with no WHERE

Among others, table modification rates are determined from queries, transaction log files, memory structures and others.

It will be appreciated by a person skilled in the art that additional categories can be defined, and additional issues can be identified and searched for by the rule engine. The additional issues can be associated with existing categories or with new ones.

Analysis

Once the relevant issues are detected, problem analysis step 212 takes place. On step 212, one or more analysis issues are analyzed and prioritized based on multiple issues belonging to one or more detection categories detected on detection step 208. The analysis issues are prioritized according to their estimated performance impact, and correlated with additional detection issues from other detection categories, which may relate to the same issue or may affect each other. It will be appreciated by a person skilled in the art that at least two detection issues should be detected in order for correlation to take place. On the other hand, an issue may be determined not to have an effect on the performance, after being correlated with other issues. It will be further appreciated that the performance impact of an issue can be evaluated or assessed either absolutely, such as reducing the time consumption in a known percentage or in a certain period of time, or relatively to other issues.

Then on step 216 improvements are prioritized and recommendations are made to a user. It will be appreciated that also issues belonging to the different categories or to the same category may be correlated and recommendations can be produced upon such combinations. Following is an example for issues belonging to the same category: if one detected issue relates to a missing index on a first column, and another detected issue relates to a missing index on the first and a second column, the recommendation may be to add the second index only. Thus, performance for queries requiring an index on the first column only will be improved, while preventing the need for two indexes and the associated performance penalty for data modifications.

For example, a recommendation to add an index to a table (detected using issues belonging to the index schema category), wherein the table data is seldom modified (identified using activity-related issues) can be made safely. An example to a situation in which an issue is determined not to be problematic, is the following: if a relatively slow CPU is identified during data collection step 200 (hardware-related issue), but the CPU activity level of the database engine is low (activity-related issue), then such a CPU is not a problem, and no replacement recommendation will be made. The analysis is also divided into categories, wherein each analysis category is influenced by issues taken from one or more detection categories.

The analysis categories include but are not limited to:

Hardware: this category refers to hardware resource allocation, settings, inventory, or and the like.

Operating system configurations: operating system resource configuration, settings, or the like.

Instance configurations: instance resource distribution, allocation, setting, or the like.

Database configurations: database resource distribution, allocation, settings, or the like.

Application configurations: application settings, processes, connections, and other parameters that affect the way the application interacts with the database engine.

Database schema: the design structure, properties, settings and other parameters of database schema objects.

Index schema: the design, structure, properties and or settings of the index schema. This category is similar and can alternatively be analyzed together with the database schema category.

Server side objects: the coding, coding style, efficiency and other parameters associated with server side objects, e.g. stored procedures, functions and others.

Query coding: this category relates to the coding of queries, syntax, expression handling, coding techniques and others, both for application queries (ad hoc queries) and queries contained within server side objects.

Security: this category refers to the design, structure, properties, settings and other parameters of security related objects such as logins, users, schemas, identifiers, permissions and the like.

Maintenance: issues related to the design, structure, properties, settings or other parameters of maintenance processes such as backups, statistics re-computation, defragmentation processes, and the like.

Table 1 shows the interrelations between the detection issues and analysis issues, i.e. issues belonging to which detection categories are taken into account in each analysis category. Cells marked with "X" indicate no influence of the respective detection category on the analysis category, such as the lack of influence of hardware detection in Index schema analysis category. Cells marked with "1" indicate a straight-forward correlation between the detection issue and the analysis issue, cells marked with "2" indicate a regular but not straight forward correlation between the detection issue and the analysis issue, and the cells on the rightmost column, marked with a "3", relate to the activity detection category, which influences all analysis categories. Thus, activity-related issues detected during detection step 208 are necessary for analyzing and making effective recommendations associated with multiple aspects of the system. Thus, to achieve consistent improvement in any aspect of the system, the activity within the system, i.e. the costs, patterns, number and volume of various access patterns to the database should be taken into account.

Recommendations

On optional step 216 improvement recommendations are made to a user, to enhance performance in those categories for which analysis step 212 revealed deficiencies. Thus, the recommendations categories significantly correspond to the analysis categories. In some cases a large number of recommendations may be determined, which may make it difficult to a user to choose the most efficient ones. In addition, some recommendations may require significant resources or system down-time for their implementation. Therefore, a prioritization process is performed, which preferably estimates and takes into account the cost of fixing the detected issue and. The delivered recommendations can be limited to relate to those analysis results which are predicted to enhance performance in more than a predetermined threshold, to the top predetermined number of recommendations, to recommendations related to one or more categories, or the like.

The recommendation categories include but are not limited to:

Hardware: in this category recommendations are made relating to hardware resources upgrades, resource redistribution, reallocation, setting changes, or the like.

TABLE 1

| ANALYSIS | DETECTION | | | | | | | | | |
|---|---|---|---|---|---|---|---|---|---|---|
| | DATABASE SCHEMA | INDEX SCHEMA | PROG. OBJECTS | SQL CODE | SERVER CONFIG. | INSTANCE CONFIG. | DATABASE CONFIG. | HARDWARE | SECURITY | ACTIVITY |
| DATABASE SCHEMA | 1 | X | 1 | 1 | X | X | X | X | V | 3 |
| INDEX SCHEMA | 1 | 1 | 1 | 1 | X | X | X | X | X | 3 |
| SERVER SIDE CODE REWRITE | 1 | 1 | 1 | 1 | X | X | 2 | X | 2 | 3 |
| APPLICATION CODE REWRITE | 1 | 1 | 1 | 1 | X | X | 2 | X | 2 | 3 |
| SERVER CONFIG. | X | X | 2 | 2 | 2 | X | X | 2 | X | 3 |
| INSTANCE CONFIG. | X | X | 2 | 2 | X | 2 | 2 | 2 | 2 | 3 |
| DATABASE COFIG. | 2 | X | 2 | 2 | X | X | 2 | X | X | 3 |
| HARDWARE | X | X | X | X | X | X | X | 2 | X | 3 |
| SECURITY | 2 | X | 2 | 2 | X | X | X | X | 2 | 3 |
| APPLICATION CONFIG. | X | X | X | 2 | 2 | 2 | 2 | X | 2 | 3 |
| MAINTENANCE | X | X | X | X | X | 2 | 2 | 2 | X | 3 |

Operating system configurations: In this category recommendations are made relating to operating system software resource upgrades redistribution, reallocation, setting changes or the like.

Instance configurations: includes recommendations for instance resource upgrades, redistribution, reallocation, setting changes or the like.

Database configurations: includes recommendations for database resource upgrades, redistribution, reallocation, setting changes or the like.

Application configurations: includes recommendations for changes in application settings, processes, connections and other parameters that affect the way client applications interact with the database engine.

Database schema: includes recommendations for changing the design structure, properties, settings and other parameters of database schema objects.

Index schema: includes recommendations for changing the design, structure, properties and settings of the index schema or other parameters. Recommendations relating to this category can alternatively be integrated with recommendations relating to the database schema category.

Server side object code re-writes: this category includes recommendations for rewriting of server object code, such as code of stored procedures, functions, or other objects.

Application query re-writes: this category includes recommendations for rewriting of application queries (Ad hoc query).

Security: this category includes recommendations for query rewrites, changing the design, structure, properties, settings, or other parameters of security related objects such as logins, users, schemas, permissions etc.

Maintenance: this category includes recommendations for changes in the design, structure, properties, settings, or other parameters of maintenance processes such as backups, statistics re-computation, defragmentation etc.

As seen from the right-most column in Table 1, the detected activity-related issues can influence the various analysis and recommendations categories in multiple ways. The influence includes but is not limited to the following examples:

Database schema: tables may contain data which is rarely accessed or modified. This data might be of large size and create performance penalties due to increased row and index size. Analyzing activity enables the identification of such data and recommending solutions such as moving the data to a separate or external structure such as a separate table or a BLOB column.

Index schema: designing an efficient index scheme is required for balancing the positive impact of indexes for data retrieval with the overhead the indexes create for data modifications. Creating too many or too large indexes on a table can ultimately harm the overall performance of a system. Index detection locates the missing indexes for all tables. Missing indexes are prioritized according to their impact on the accumulative cost of all the queries it will affect, and if possible are merged into fewer recommendations, for example merging a one-column index addition recommendation and a two-column index addition recommendation, if the single column is included in the two columns.

Server side code rewrite: concurrency and isolation of transactions is controlled by settings of isolation levels. Simultaneous transactions that read and modify the same data scope are most prone to performance penalty due to isolation mechanisms. Analyzing the activity enables the identification of the server objects such as stored procedures, functions, triggers and others that participate in such transactions and to suggest a code rewrite that will change isolation level either with a SET statement or with a hint. For example, if simultaneous activity is detected from procedure A and B where A reads data and B modifies it, setting A to "snapshot isolation" may improve procedure A's performance.

Application code rewrite: during detection step 208 code rewrites are detected that may help the database engine to use indexes most efficiently. The activity analysis enables the estimation of the impact of the rewrites and prioritization of the rewrites accordingly. For example, if a table is found to have most of its activity as "full scans", a rewrite that will enable better index usage for that table will be overall less effective than on a table with similar characteristics on which most of the activity is "single row fetch".

Database configuration: the database physical layout configuration has a direct effect on its performance. The activity analysis enables the detection of static tables, i.e. tables that are seldom modified. Moving all these tables to a logical container (for example a file group in SQL Server) that is set to "read only" may improve its performance since no isolation mechanism is required for read-only data. A fail-safe mechanism is optionally implemented in case data modification is required, for example by intercepting modification queries and toggling the file group back to READ/WRITE when required.

Hardware: activity analysis enables the identification of which resources are accessed concurrently. This enables to recommend disk resource redistribution to eliminate contention for concurrent read or write operations. For example, if a server has N disks for holding the data in a single raid array, splitting the N disks into M (M<N) separate arrays and spreading the objects across the arrays, may improve performance due to contention elimination for IO resources.

Security: multiple permission paths may cause a performance overhead for the server, since the server has to evaluate all active permissions. Multiple permission paths occur when a connection's security context is a member of other security objects (such as groups, roles etc.), which may also have permissions set and may be members of further security objects. The activity module enables the determination of which objects are frequently accessed; hence their overhead for multiple permission paths will incur a more significant performance penalty. Thus, a change may be suggested to the security scheme which will eliminate the multiple permission paths issue.

Maintenance: Transaction log backups are a standard procedure of servers such as SQL Server maintenance. The frequency of the backups has a direct effect on the database's performance. If the backups are performed too seldom they might become large and take a long time to complete. While the backup is being performed, there is an increased load on IO resources which hurts the database performance. If the backups are too frequent, the overhead of the backup process itself will hurt performance. The activity analysis enables the estimation of the modification rates of a database, and therefore to suggest altering the log backup frequency to a more efficient setting.

Executing Recommendations

On optional step 220, one or more of the recommendations made on step 216 are performed. Naturally, some recommendations can be made automatically, such as adding indexes, defragmenting objects or others, while others such as hardware upgrades require user intervention. However, some recommendations may involve a risk to the system. For example, changing the transaction isolation level may affect the application behavior in terms of consistency and atomicity. Another factor is the amount of resources required for implementing the recommendation. For example, changing the schema of a table may involve multiple steps such as copying the data, removing or disabling dependent objects which may require considerable I/O resources and time, thus worsening the performance of the database during the time it takes for the implementation to complete, and possibly even causing temporary system down time. Thus the risk level and the required resources are significant factors when a recommendation is to be implemented as "automatic" or not. The recommendations are thus divided into the following categories:

Recommendations that can be implemented automatically are recommendations whose implementation pose very little or no risk of negatively affecting application or database performance or breaking application behavior or dependencies, and require relatively low resources for their application. This may include for example the removal of duplicate indexes, addition of relatively small indexes on tables that are rarely modified, changing some database and server settings such as "database auto close" and "auto shrink" and others.

Recommendations that can be partly or fully automatically implemented but require user intervention or quality assurance. Such recommendations may pose some degree of risk to the applications functionality or performance, or require considerable resources for its implementation, or require system down time, and will thus not be carried our automatically. This category includes but is not limited to dropping indexes, changing schema, changing significant settings, and others. This category preferably includes recommendations that require down time such as moving database files, changing clustered indexes etc. Such recommendations are preferably scripted automatically and given to the user for inspection, QA, adjustments and the like.

Recommendations that cannot be automated: these are recommendations that require manual operations and currently cannot be scripted. Such recommendations will be presented to a user with a detailed report and instructions related to the required corrective actions. If in the future it will be possible to carry out such activity automatically, then such recommendation will be classified to the previous category.

General recommendations and warnings: some recommendations such as design issues, security, application behavior and others that require recoding, redesign or extensive modifications are presented in general detail but without a detailed line out of the required corrective actions.

Reporting

Optional step 204 can be accessed after every step. The reported detected issues, analyzed issues, recommendations, or executed recommendations are presented accordingly. The reports can be prioritized and interactive, i.e. a user will be able to group issues or recommendations according to various parameters, such as a category, a specific object, impact or others. A user can preferably select or unselect specific issues or issue groups from the report. The issues are preferably presented with a short description and expected impact. The presentation may also include links to external or internal resources that provide more details. Reported issues can be grouped, for example into: environmental issues, comprising hardware, operating system settings, instance settings, application settings, and database settings; database issues comprising database schema, index schema, security, and maintenance; and code rewrites comprising server side objects code re-write and application queries re-writes. Recommendation reports are optionally prioritized, i.e. include estimations of each recommendation impact.

It will be appreciated by a person skilled in the art, that some collection steps, such as the collecting data related to the activity should be performed online, i.e. when the system is active. However, other steps, such as collecting other data, detecting, analyzing and others can be performed either online or offline, i.e., when the system is not active, or on another system which does not influence the operational environment, such as a backup system, a similar system or any other.

Figure 3:
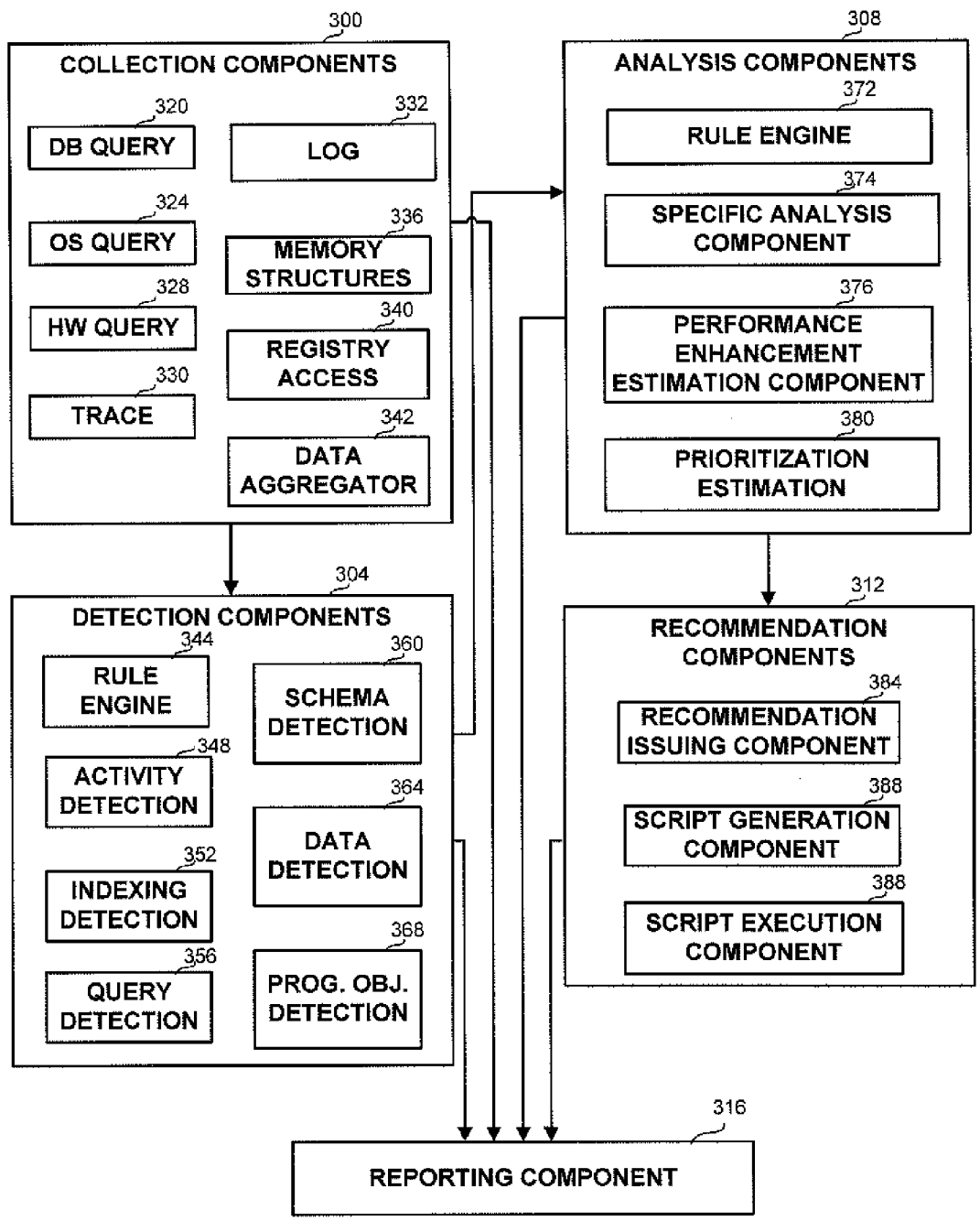
FIG. 3 is a block diagram of the main components in a preferred embodiment of an apparatus according to the disclosure.

Referring now to FIG. 3, showing a schematic block diagram of an apparatus, according to a preferred embodiment of the disclosure. The apparatus is preferably implemented as a set of one or more software components, such as DLLs, static libraries, executables, scripts, or others. The components are preferably run on server 100 of FIG. 1, any client shown in FIG. 1, or on another computing platform that is in communication with or can access DB engine 102 and preferably one or more clients. The components can be programmed in any programming language or script and under any development environment.

The apparatus comprises collection components 300 for collecting raw data and meta data related to the environment in which the disclosure is used; detection components 304 for detecting performance-hindering issues within the collected data, the issues belonging to one or more categories; analysis components 308 for correlating the issues, discovering root issues behind the detected issues and prioritizing them; recommendation components 312 for issuing recommendations for suggesting ways of implementing the recommendations and optionally correcting them; and reporting module 316 for reporting to a user the activities and results of collection components 300, detection components 304, analysis components 308 or recommendation components 312.

Collection components 300 comprise components for accessing and retrieving data from various aspects of the environment. It will be appreciated that one or more of the components listed below may exist in an apparatus according to the disclosure, and that additional collection components can be implemented and used. The components include a DB query component 320 for querying the data base. Querying optionally relates to structural issues, such as table structure, indexing, settings and the like, as well as dynamic issues, and in particular the activity within the database, e.g. the number and volume of inserted, deleted, changed, retrieved or otherwise manipulated data. The activity data can be retrieved by using one or more performance counters, trace data, log files etc. Collection components 300 further comprise operating system querying component 324 for querying the operating system, regarding for example settings, versions, users, permissions and others. Another component of collection components 300 is hardware querying component 328, for retrieving data related to the hardware of the environment, such as CPU type and speed, available disk space, communication bandwidth and others. Yet other components are trace collection component 330 for collecting information from the database traces, and log collection component 332 for collecting information from logs. Collection components 300 optionally comprise also memory structures querying component 336 for querying various memory structures, such as memory structures related to the run-time execution of the database, and registry access component 340 for querying the registry of the server or one or more clients within the environment. Registry access component 340 can be implemented as part of operating system querying component 324. Collection components 300 further comprise data aggregator 342 for scanning and aggregating the information collected form the various sources, and preparing it for detection components 304.

The data collected from the various querying components is transferred to detection components 304. Detection components 304 preferably comprise rule engine 344 which retrieves rules and applies the rules to the collected data. The rules can be hard coded or stored in any required format, such as text, XML, database entities or others, as long as rule engine 344 is adapted to parse and apply them. Rule engine 344 optionally uses specific detection components for applying rules related to a specific category for assessing the existence of a situation associated with the rule within the environment. The division to components is mainly logical, and the specific components can alternatively be implemented as part of rule engine 344. The specific components may include but are not limited to: activity detection component 348 for applying rules related to the activity of the database, such as number and volume of accesses to one or more tables; indexing detection component 352 for detecting issues related to indexes of tables, such as a missing index; query detection component 356 for detecting issues related to the construction, coding and usage of queries by client applications and queries contained within server objects; schema detection component 360 for detecting issues related to the schema of the database, such as issues related to column size; data detection 364 for detecting issues related to the data stored in the database, i.e. the actual records; and programming object detection component 368 for detecting issues related to the implementation (rather than the usage) of the programming objects such as stored procedures, and others.

Analysis components 308 preferably comprise a rule engine 372 for applying analysis rules, and in particular combinations of issues detected by detection components 304, for example according to the combinations shown in Table 1 above. Analysis components 308 further comprise one or more specific analysis components 374 for analyzing issues related to a specific analysis category, such as but not limited to database schema, indexing schema, server side code, application code, server configuration, instance configuration, database configuration, application configuration, hardware, security, or maintenance. Analysis components 308 further comprise performance enhancement estimation component 376 for estimating the performance impact of resolving each detected analysis rule, and prioritization estimation component 380 for prioritizing the detected analysis results.

Recommendation components 312 comprise recommendation issuing component 384 for issuing one or more recommendation based on the analyzed issues and their prioritization. The recommendations can take the form of a general recommendation to be implemented by a user, such as "upgrade database to higher version", or a recommendation that can be performed automatically. For such recommendations, a script is optionally generated by script generation component 312, which can be provided to a user. In a preferred implementation, if the user explicitly or implicitly authorizes, the script is automatically executed by script execution component 388.

Reporting component 316 provides reports about the collected data, detected issues, analyzed issues, and recommendation issuing, generation and execution. The reports can be sorted or grouped according to priorities, categories, permissions and any other criteria.

The disclosure detailed above provides for enhancing the performance of an environment including a database managed by a database server and accessed by one or more clients. The method and apparatus collect information from multiple components of the environment, including hardware, operating system, database schema, database contents and particularly activity levels. Then issues are detected from the collected information, preferably by a rule engine, and later the detected issues are correlated and prioritized, and recommendations are established for enhancing the performance.

The disclosed method and apparatus adopt a total approach so that corrections are made to aspects so that total improvement is achieved rather than improving a specific aspect which may be insignificant for the total performance, or a specific aspect, the correction of which may harm other aspects.

It will be appreciated by a person skilled in the art that the disclosed details, and in particular the categories and issues of the detection, analysis and recommendation steps are optional, and that different, additional or other categories and issues can be used. It will be further appreciated that the correlation between the detection and the analysis can be designed to include or exclude other issues than those reflected in table 1.

Due to the complexity of database environments, the multiplicity of factors, and the frequent improvements in hardware, firmware, and software, exact numbers, limitations or ranges can not be provided for terms used throughout the description, such as "slow", "many" and others. The specific implementation details should be adjusted to the specific environment, its characteristics and the requirements. However, such terms are used in an exemplary manner and are not intended to limit the scope of the disclosure.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. In a computerized environment comprising at least one computing platform executing a database engine, a method for enhancing the performance of the database engine or the computerized environment, the method comprising:
   receiving data related to at least two aspects of the environment;
   detecting from the data at least two detection issues associated with at least two detection categories of the system, wherein one of the at least two detection categories is a query code category, the query code category defines issues related to coding of query statements executed by the environment;
   correlating the detection issues to determine at least one analysis issue;
   analyzing the at least one analysis issue related to at least one analysis category, wherein the at least one analysis category is selected from analysis categories influenced by issues detected in the coding of the query statements; and
   issuing at least one recommendation based, in part, on the analysis of the at least analysis issue and the coding of the query statements.

2. The method of claim 1 wherein the at least one recommendation includes at least code re-writes of the query statements executed by the environment.

3. The method of claim 2 further comprising:
   generating a script for implementing at least one recommendation; and
   executing the script implementing the at least one recommendation.

4. The method of claim 1 further comprising collecting the data related to at least two aspects of the environment.

5. The method of claim 1 wherein the data relates to any at least two aspects selected from the group consisting of: hardware; operating system; database engine; database meta data; data stored in the database; activity; performance metrics; and historical trends.

6. The method of claim 5 wherein the database meta data comprises at least one item from the group consisting of: database schema; database objects; and database code.

7. The method of claim 1 wherein at least one another detection category of at least two detection categories are selected from the group consisting of: database schema; index schema; programming objects code;
programming objects usage; database configuration; instance configurations; server configuration; hardware; security; and activity.

8. The method of claim 7 wherein the activity detection category relates to at least one activity from the group consisting of: retrieving data from a database; adding data to a database; updating data within a database; and deleting data from a database.

9. The method of claim 1 wherein the at least one analysis category is selected from the group consisting of: hardware, operating system configuration; instance configuration; database configuration; application configuration; database schema; index schema; server side object; application query coding; security; and maintenance.

10. The method of claim 1 further comprising reporting to a user the information related to the detection or to the analysis.

11. The method of claim 1, wherein detecting coding issues of the query statements comprises detecting at least one of non-optimal coded query statements and improper usage of literals in query statements.

12. In a computerized environment comprising at least one computing platform executing a database engine executed by a first computing platform, an apparatus for enhancing the performance of the database engine or the computerized environment, the apparatus comprising:
detection components, the detection components comprising at least one specific detection component for assessing the existence of at least two detection issues associated with at least two detection categories within the environment, according to a detection rule, wherein one of the at least two detection categories is a query code category, the query code category defines issues related to coding of query statements executed by the environment;
analysis components, the analysis components comprising: at least one specific analysis component for correlating the detection issues to determine at least one analysis issue and analyzing the at least one analysis issue related to at least one analysis category from the at least two detection issues by applying at least one analysis rule, wherein the at least one analysis category is selected from analysis categories influenced by issues detected in the coding of the query statements;
a performance enhancement estimation component for evaluating the performance enhancement of resolving the situation associated with the at least one analysis rule; and
at least one recommendation component for issuing at least one recommendation to resolve the situation based, in part, on the analysis of the at least analysis issue and the coding of the query statements, wherein the at least one specific detection component or the at least one at least one specific analysis component or the performance enhancement estimation component is adapted to be executed by the first computing platform or by a second computing platform, each of the first computing platform and the second computing platform includes a processor coupled to a memory.

13. The apparatus of claim 12 wherein at least one specific detection component comprises at least one component from the group consisting of: an activity detection component; an indexing detection component; a query detection component; a schema detection component; a data detection component; and a programming object detection component.

14. The apparatus of claim 12 wherein the detection components further comprise a rule engine for activating the at least one specific detection component.

15. The apparatus of claim 12 wherein the at least one specific analysis component comprises at least one component from the group consisting of: database schema analysis component; indexing schema analysis component; server side code analysis component; application code analysis component; server configuration analysis component; instance configuration analysis component; database configuration analysis component; application configuration analysis component; hardware analysis component; security analysis component; and maintenance analysis component.

16. The apparatus of claim 12 wherein the analysis components further comprise a prioritization estimation component for prioritizing the at least one analysis rule.

17. The apparatus of claim 12 wherein the at least one recommendation includes at least code re-writes of the query statements executed by the environment.

18. The apparatus of claim 17 wherein the recommendation components further comprise a script generation component for generating a script for implementing the at least one recommendation; and a script execution component for executing the script for implementing the at least one recommendation.

19. The apparatus of claim 12 further comprising collection components for collecting the data from the environment.

20. The apparatus of claim 19 wherein the collection components comprise at least one component from the group consisting of: database query component; operating system component; hardware component; memory structures component; registry access component; trace collection component; log collection component; and data aggregator component.

21. The apparatus of claim 12 further comprising a reporting component for reporting to a user at least one result of the detection components or the analysis components.

22. The apparatus of claim 12 wherein the computerized environment comprises at least one client computing platform.

23. The apparatus of claim 12, wherein the detection component further detects coding issues including at least one of non-optimal coded query statements and improper usage of literals in query statements.

24. A computer readable storage medium containing a set of instructions for a general purpose computer, the set of instructions comprising:
receiving data related to at least two aspects of a computerized environment comprising at least one computing platform executing a database engine;
detecting from the data at least two detection issues associated with at least two detection categories of the system, wherein one of the at least two detection categories is a query code category, the query code category defines issues related to coding of query statements executed by the environment;

correlating the detection issues to determine at least one analysis issue;
analyzing the at least one analysis issue related to at least one analysis category, wherein the at least one analysis category is selected from analysis categories influenced by issues detected in the coding of the query statements; and issuing at least one recommendation based, in part, on the analysis of the at least analysis issue and the coding of the query statements.

* * * * *